United States Patent
Bird

(10) Patent No.: US 9,712,647 B2
(45) Date of Patent: Jul. 18, 2017

(54) OPTIMIZATION OF COMPUTING RESOURCES THROUGH MONITORING AND MANIPULATING AVAILABILTY

(71) Applicant: CA, INC., Islandia, NY (US)

(72) Inventor: John Sinclair Bird, Ringwood North (AU)

(73) Assignee: CA, INC., Islandia, NY (US)

( * ) Notice: Subject to any disclaimer, the term of this patent is extended or adjusted under 35 U.S.C. 154(b) by 263 days.

(21) Appl. No.: 14/293,636

(22) Filed: Jun. 2, 2014

(65) Prior Publication Data

US 2015/0350047 A1 Dec. 3, 2015

(51) Int. Cl.
*H04L 29/06* (2006.01)
*H04L 12/26* (2006.01)
*H04L 12/12* (2006.01)

(52) U.S. Cl.
CPC .............. *H04L 67/42* (2013.01); *H04L 12/12* (2013.01); *H04L 43/0817* (2013.01); *H04L 43/16* (2013.01); *Y02B 60/34* (2013.01)

(58) Field of Classification Search
None
See application file for complete search history.

(56) References Cited

U.S. PATENT DOCUMENTS

| | | | |
|---|---|---|---|
| 5,542,035 A | 7/1996 | Kikinis et al. | |
| 8,332,869 B2 | 12/2012 | Stevens, IV | |
| 2005/0044430 A1* | 2/2005 | Cheshire | G06F 1/3209 713/300 |
| 2010/0332212 A1* | 12/2010 | Finkelman | G06F 1/3203 703/23 |
| 2011/0191610 A1* | 8/2011 | Agarwal | G06F 1/3203 713/310 |
| 2011/0191640 A1* | 8/2011 | Oh | G06F 12/00 714/54 |
| 2011/0219104 A1* | 9/2011 | Sugawara | G06F 15/173 709/223 |
| 2012/0331318 A1 | 12/2012 | Chan et al. | |
| 2013/0182795 A1* | 7/2013 | Cherian | H04L 25/02 375/316 |
| 2015/0135259 A1* | 5/2015 | Ilyadis | H04L 63/0227 726/1 |

FOREIGN PATENT DOCUMENTS

EP        0974904 A1    1/2000

* cited by examiner

*Primary Examiner* — Natisha Cox
(74) *Attorney, Agent, or Firm* — Sage Patent Group

(57) ABSTRACT

In a method of managing a computing network, an expected behavior of a host is determined. The host is associated with a network resource, and is configured to be switched between active and inactive states. When the host is in the inactive state, a message is transmitted via the network on behalf of the host based on the expected behavior thereof such that the host appears to be in the active state. Related computer systems and computer program products are also discussed.

17 Claims, 7 Drawing Sheets

OPTIMIZATION OF COMPUTING RESOURCES THROUGH MONITORING AND MANIPULATING AVAILABILTY

BACKGROUND

Various embodiments described herein relate to computer systems, methods and program products and, more particularly, to management of computer systems, methods and computer program products.

The costs of having host/server computers in a data center switched on and running may be significant, both in terms of resources (e.g., CPU, RAM, disk as well as power/cooling etc.) and money. For example, the costs of server power consumption and cooling systems to dissipate the generated heat may be major expenses in modern data centers.

To maintain effective operation and sustain profitability, power management systems may be used to reduce power usage while simultaneously satisfying customer requirements. For example, a typical server may consume a relatively high amount of power even when idle, due for instance to chip leakage current and/or power consumption of other supporting components, such as disk drives and network routers.

Turning a system off and directing traffic to a subset of available servers during non-peak hours may be one approach to saving power during periods of low traffic. Some such technologies for server shutdown may mainly be based on manual actions by system administrators. However, having to manually power on hosts when required may be tedious and/or difficult to manage, for example, due to the amount of manual effort required and/or due to over-provisioning that may be used to ensure that performance goals are met. Likewise, while some server shutdown/startup technologies may be automated, they are typically driven by simple policies. For example, some automated resource management solutions may simply base the conditions to detect host shutdown/startup on the time of day and/or date.

SUMMARY

According to some embodiments of the present disclosure, in a method of managing a computing network, an expected active-state behavior of a host is determined. The host is associated with a network resource, and is configured to be switched between active and inactive states. When the host is in the inactive state, a message is transmitted via the network on behalf of the host based on the expected behavior thereof such that the host appears to be in the active state. The determining and the transmitting are performed by at least one processor, which may be distinct from hardware associated with the host.

According to further embodiments of the present disclosure, a computer system for managing a computing network includes at least one processor and a memory coupled to the processor. The memory includes computer readable program code embodied therein that, when executed by the processor, causes the processor to determine an expected active-state behavior of a host. The host is associated with a network resource, and is configured to be switched between active and inactive states. When executed by the processor, the computer readable program code further causes the processor to transmit, when the host is in the inactive state, a message via the network on behalf of the host based on the expected behavior thereof such that the host appears to be in the active state.

According to still further embodiments of the present disclosure, a computer program product for managing a computing network includes a computer readable storage medium having computer readable program code embodied in the medium. The computer readable program code includes computer readable program code to determine an expected behavior of the host. The host is configured to be switched between active and inactive states, and is associated with a network resource. The computer readable program code further includes computer readable program code to transmit, when the host is in the inactive state, a message via the network on behalf of the host based on the expected behavior thereof such that the host appears to be in the active state.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
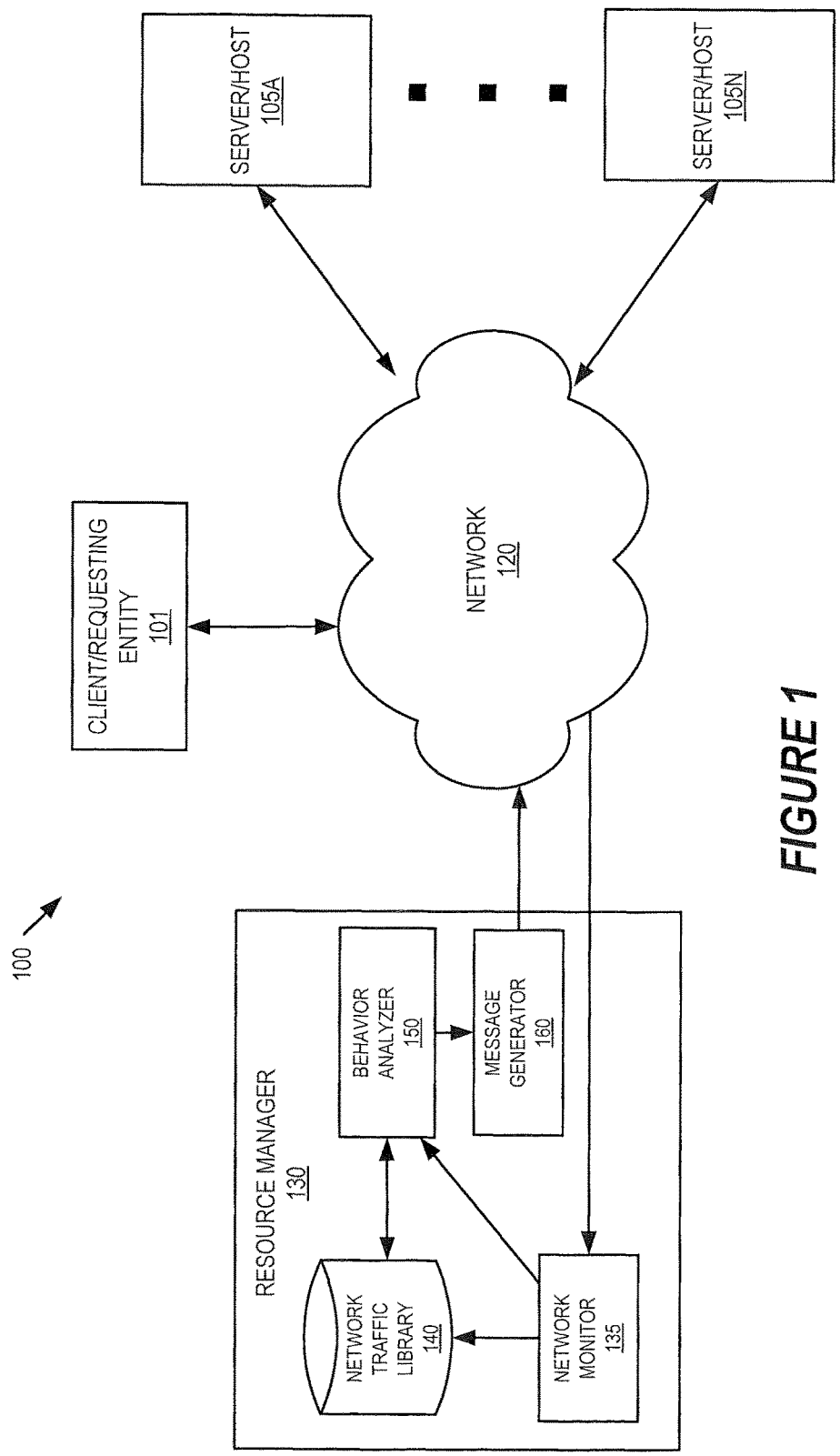
FIG. 1 is a block diagram of a computing system or environment for managing computing resources by monitoring and manipulating availability in accordance with embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or environment may include one or more hosts, operating systems, peripherals, and/or applications. Machines in a same computing system or environment may have shared memory or resources, may be associated with the same or different hardware platforms, and/or may be located in the same (e.g., local) or different (e.g., remote) physical locations. Computing environments described herein may refer to a virtualized environment (such as a cloud environment) and/or a physical environment. Machines or servers described herein may refer to physical machines or virtual machines (VMs), which may be managed by one or more virtual hypervisors in some embodiments.

Some embodiments of the present disclosure may arise from realization that some current automated resource management solutions may be driven by relatively simple policies (for example, basing conditions for host shutdown/startup on time of day and/or date), which may not be a good fit in all cases. For instance, a user/client working over a weekend may not be able to access the necessary servers/hosts to perform their duties when resource management is based on such simple polices. Additional problems may also arise in that certain network tools and protocols may rely on a 'heart beat' like response to continue operating, which may limit the use of such simplistic resource management. Also, some protocols (such as Simple Services Discover Protocol (SSDP) and/or Common Internet File System (CIFS)) may require servers to respond appropriately in order to maintain a list of shares and/or services (e.g., printers); thus, having the servers offline may also mean that the managed services/shares are also offline.

Accordingly, embodiments of the present disclosure may detect incoming requests and/or other attempts to access network resources hosted on a server or other system, and may power and/or de-power the associated servers accordingly, in an on-demand fashion. Furthermore, even when the server itself is in a powered-off state, responses to incoming requests can be handled on behalf of the server to maintain the appearance of availability. Embodiments of the present disclosure thereby allow machines, physical and/or virtual, to be automatically put into a low/no power state when not required, as well as to be restarted when required, thus coordinating the availability of a network resource or other service based on demand.

As such, embodiments of the present disclosure may differ from other operations for automatic shutdown/startup of a computer system in that the conditions for shutdown/startup may be, but are not necessarily, based on the system time. Rather, conditions for shutdown/startup can be determined using an 'on-demand' method, i.e., when the access to the resource is requested, the corresponding host can be started. Furthermore, methods of determining requests for access may involve both learning and acting on information obtained through monitoring network traffic to the host in question, in order to determine whether the host can be maintained in an inactive state. As used herein, an "inactive state" may refer to shutdown/suspend/sleep/hibernate states, or more generally, to low- or no-power states.

Thus, embodiments of the present disclosure are not only directed to signaling a host as to when to transition to/from an inactive state, but also to prolonging the duration for which the host can remain in the inactive state, by providing an appearance of availability even when the host is inactive, and signaling the host to awake from the inactive state when needed or otherwise on-demand. Embodiments of the disclosure may be implemented as a running program with network access to the hosts it is managing.

FIG. 1 is a block diagram illustrating a computing system or environment for managing computing resources by monitoring and manipulating availability in accordance with some embodiments of the present disclosure. Referring now to FIG. 1, the environment 100 includes at least one client or other requesting entity 101, one or more servers/hosts 105A-105N, and a resource manager 130 communicatively coupled via a network 120. The servers/hosts 105A-105N are configured to manage one or more network resources (collectively and/or individually) to provide hardware and/or software services, for example, responsive to requests from the client/requesting entity 101.

The resource manager 130 is configured to signal the servers/hosts 105A-105N to switch between inactive and active states in an on-demand manner, allowing for improved resource conservation. In the embodiment of FIG. 1, the resource manager 130 includes a network monitor 135, a behavior analyzer 150, a message generator 160, and a network traffic library 140. The network traffic library 140 stores a set of messages (including requests and associated responses) and/or other data sampled from prior communications with (i.e., to and/or from) the servers/hosts 105A-105N. The resource manager 130 operates by observing communications between one or more clients/requesting entities 101 and the servers/hosts 105A-105N via the network monitor 135, imitating or mimicking the behavior of the servers/hosts 105A-105N by determining the expected server/host behavior via the behavior analyzer 150, and transmitting a corresponding message on behalf of the server/host via the message generator 160, as discussed in detail herein. In some embodiments, the resource manager 130 may be implemented by hardware that is distinct from the hardware associated with the servers/hosts 105A-105N.

The network monitor 135 may include or implement a network monitoring tool for monitoring communications with the servers/hosts 105A-105N. The clients/requesting entities 101 and the servers/hosts 105A-105N may communicate via the network 120 using any number of communications modes or protocols. The network monitor 135 records network traffic and/or other data communicated via the network 120, particularly messages (including requests and responses thereto) communicated with (i.e., to and/or from) the servers/hosts 105A-105N, for example, using a network sniffer tool. The network monitor 135 stores these messages in the network traffic library 140. For example, the network monitor 135 may store the messages received by and transmitted from the servers/hosts 105A-105N in the network traffic library 140, as request/response pairs. Any number of message interactions with the servers/hosts 105A-105N can be recorded, for example, as may be needed for message generation as discussed below. The network traffic library 140 thus provides historical data for the servers/hosts 105A-105N, which is used as a source for expected behavior analysis and response generation as described below.

The behavior analyzer 150 is configured to determine an expected behavior of one or more of the hosts 105A-105N based on the network traffic communicated therewith, as stored in the network traffic library 140. In some embodiments, the behavior analyzer 150 may determine the expected behavior for a host 105A-105N by comparing an incoming request or other current network conditions with the network traffic previously communicated with that host, and identifying a particular message among the messages stored in the network traffic library 140 that most closely corresponds to the incoming request or other current network conditions.

When one or more of the servers/hosts 105A-105N are in an inactive state, the message generator 160 is configured to synthesize or otherwise generate a message based on the expected behavior of the servers/hosts 105A-105N as determined by the behavior analyzer 150. The message may be, for example, a recurring message (such as an availability indicator) transmitted by a server/host 105A-105N at a predetermined time and/or frequency. Additionally or alternatively, the message may be a response to a request for a resource managed by the server/host 105A-105N. In some embodiments, the message may be a response corresponding to a particular one of the request/response pairs stored in the network traffic library, as identified by the behavior analyzer 150 based on an incoming request or other network conditions. The message generator 160 thereby generates and transmits a message via the network 102 on behalf of the associated server/host 105A-105N, when that server/host 105A-105N is in an inactive state. Thus, a response or other message that would have been provided by an active server/host 105A-105N is automatically generated using the request/response pairs stored in the network traffic library 140 and transmitted via the network 120 even when the server/host 105A-105N is inactive, providing an appearance of availability while allowing the inactive state to be prolonged.

It will be appreciated that in accordance with various embodiments of the present disclosure, the resource manager 130 and the servers 105A-105N may be implemented as a single server, separate servers, or a network of servers (physical and/or virtual), which may be co-located in a server farm or located in different geographic regions. In particular, as shown in the example of FIG. 1, the resource manager 130 is coupled to the servers 105A-105N via network 120. The network 120 may be a global network, such as the Internet or other publicly accessible network. Various elements of the network 120 may be interconnected by a wide area network (WAN), a local area network (LAN), an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks. Although illustrated as a common network, it will be understood that the network 120 may represent one or more separate networks in some embodiments. As such, one or more of the resource manager 130 and the servers 105A-105N may be co-located or remotely located, and communicatively coupled by one or more of the networks. More generally, although FIG. 1 illustrates an example of a computing environment 100, it will be understood that embodiments of the present disclosure are not limited to such a configuration, but are intended to encompass any configuration capable of carrying out the operations described herein.

Figure 2:
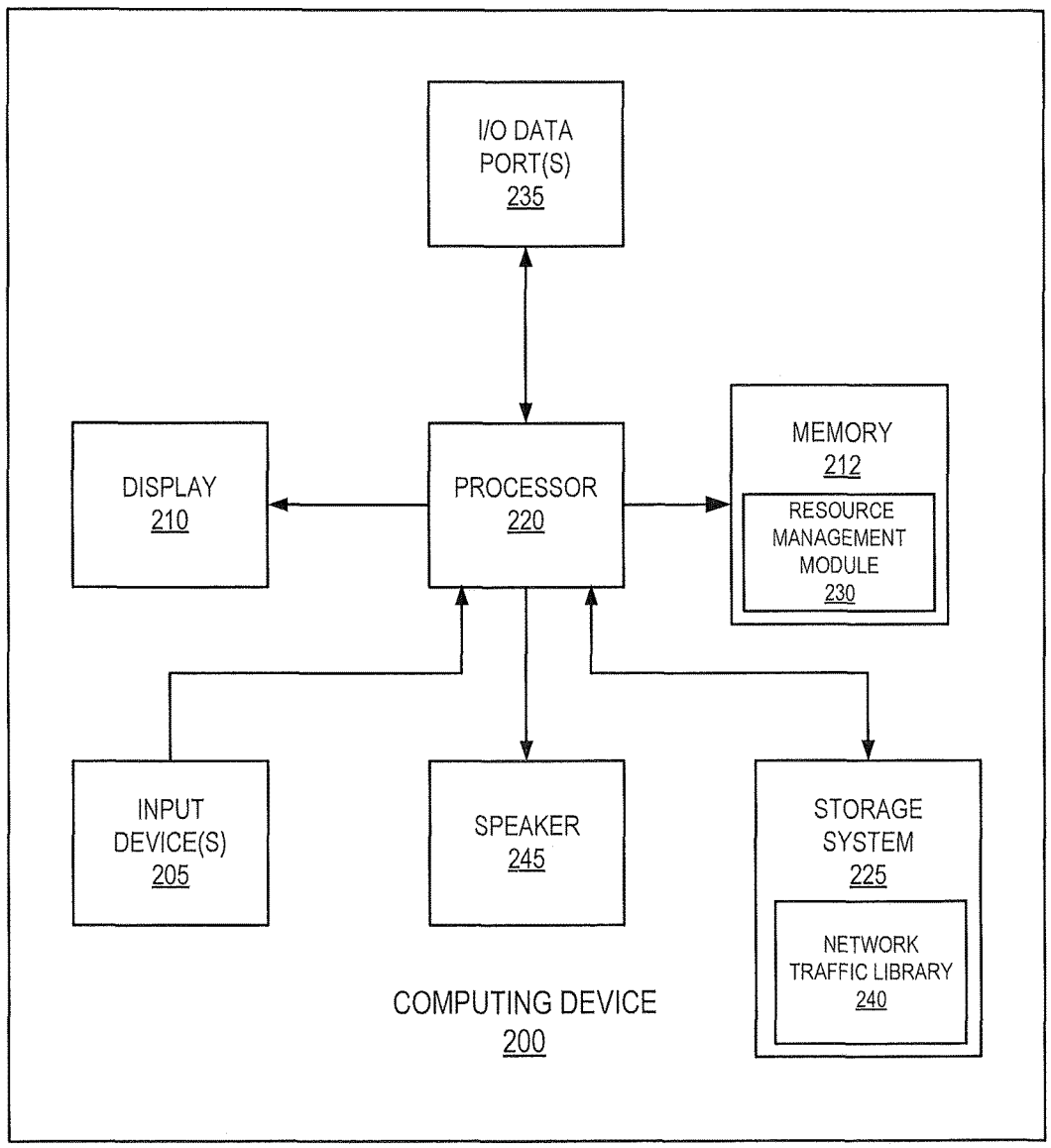
FIG. 2 is a block diagram that illustrates computing device for managing computing resources by monitoring and manipulating availability in accordance with embodiments of the present disclosure.

FIG. 2 illustrates an example computing device 200 in accordance with some embodiments of the present disclosure. The device 200 may be used, for example, to implement the resource manager 130 in the system 100 of FIG. 1 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 215 that communicate with one or more processors 220 (generally referred to herein as "a processor"). The computing device 200 may further include a storage system 225, a speaker 245, and I/O data port(s) 235 that also communicate with the processor 220. The memory 212 may include a resource management module 230 installed thereon. The resource management module 230 may be configured to control startup/shutdown (or more generally, active/inactive states) of one or more servers or hosts that manage resources on a network, as well as to mimic the behavior of the host(s) in response to requests for the network resources and/or other network conditions, as described herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may include a network traffic library 240 storing network traffic (including but not limited to requests and associated responses) and other data communicated with a host, which may be accessed by the resource management module 230 to determine an expected behavior of an inactive host and transmit a response on its behalf, as described herein. Although illustrated in separate blocks, the memory 212 and the storage system 225 may be implemented by a same storage medium in some embodiments.

The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

Figure 3:
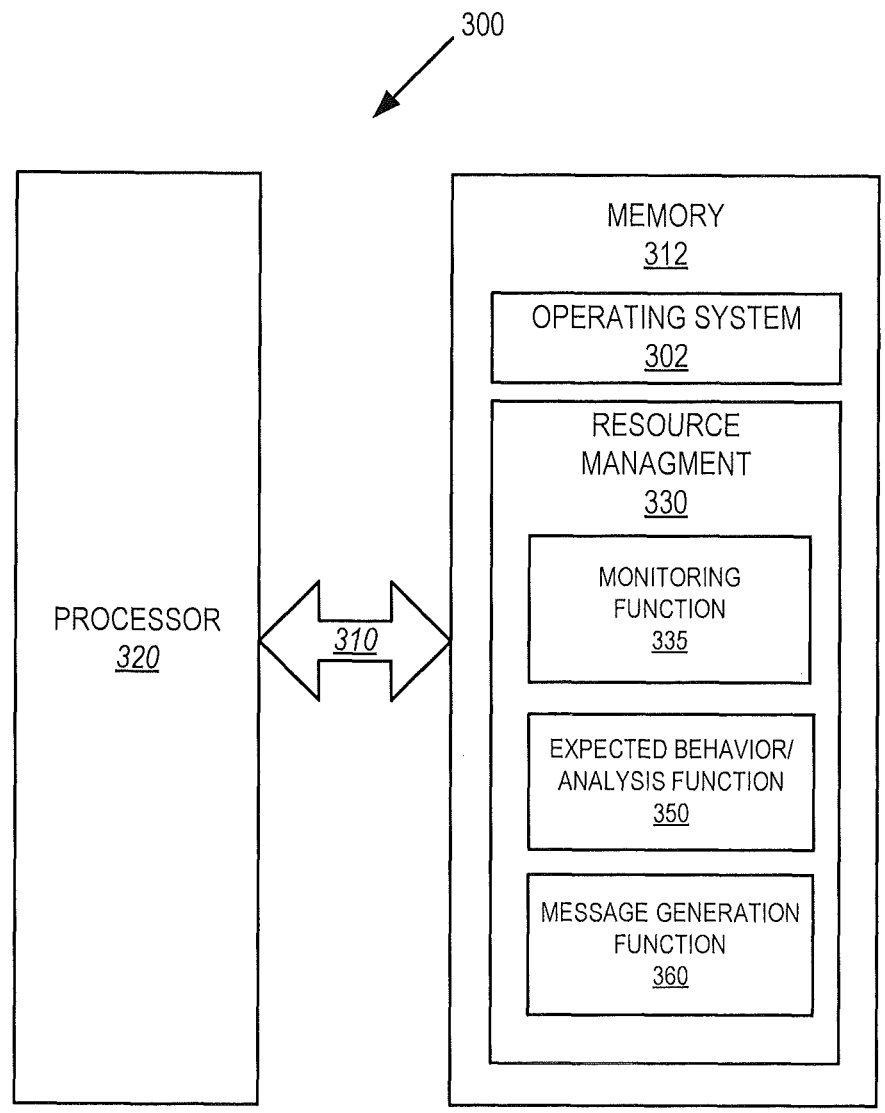
FIG. 3 is a block diagram that illustrates a software/hardware architecture for managing computing resources by monitoring and manipulating availability in accordance with embodiments of the present disclosure.

FIG. 3 illustrates a software/hardware architecture 300 for management of network resources in accordance with further embodiments of the present disclosure. In particular, FIG. 3 illustrates a processor 320 and memory 312 that may be used in computing devices or other data processing systems, such as the computing device 200 of FIG. 2 and/or the environment 100 of FIG. 1. The processor 320 communicates with the memory 312 via an address/data bus 310. The processor 320 may be, for example, a commercially available or custom microprocessor, including, but not limited to, digital signal processor (DSP), field programmable gate array (FPGA), application specific integrated circuit (ASIC), and multi-core processors. The memory 312 may be a local storage medium representative of the one or more memory devices containing software and data in accordance with some embodiments of the present invention. The memory 312 may include, but is not limited to, the following types of devices: cache, ROM, PROM, EPROM, EEPROM, flash, SRAM, and DRAM.

As shown in FIG. 3, the memory 312 may contain multiple categories of software and/or data installed therein, including (but not limited to) an operating system block 302 and a resource management block 330. The operating system 302 generally controls the operation of the computing device or data processing system. In particular, the operating system 302 may manage software and/or hardware resources and may coordinate execution of programs by the processor 320, for example, in providing the environment 100 of FIG. 1.

The resource management block 330 is configured to carry out some or all of the functionality of the network monitor 135, the behavior analyzer 150, and/or the message generator 160 of FIG. 1. As such, the resource management block 330 includes a monitoring function or module 335, an expected behavior/analysis function or module 350, and a message generation function or module 360.

The monitoring module 335 is configured to monitor network conditions, including network traffic communicated with a host (such as one or more of the servers/hosts 105A-105N of FIG. 1) when the host is in the active state. The network traffic may include messages, such as requests communicated to the host, and associated responses to the requests communicated from the host. The monitoring module 335 can automatically create a database (e.g., the network traffic library 140 of FIG. 1) storing the messages communicated with the host during the active state (for example, as request/response pairs) responsive to monitoring the network traffic communicated with the host. The monitoring module 335 may also be configured to identify and enumerate the network resource(s) managed by the host responsive to monitoring the network traffic communicated therewith. The monitoring module 335 can further detect an activity level of the host relative to one or more predetermined thresholds, and the resource management block 330 may signal the host to transition from the active state to the inactive state based on the detected activity level relative to the threshold(s). The threshold(s) may be time-based, date-based, and/or traffic-based in some embodiments.

The expected behavior/analysis module 350 is configured to determine an expected active-state behavior of the host. The expected behavior may be determined based on the current network conditions monitored by the monitoring module 335 and/or based on network traffic previously communicated with the host (e.g., as stored in the network traffic library/database). For example, based on the previously communicated traffic, the expected behavior/analysis module 350 may determine that the host is expected to transmit a recurring message associated with its network resource(s) under certain network conditions, e.g., that the host is expected to transmit an availability indicator at a particular time and/or frequency. Additionally or alternatively, the expected behavior/analysis module 350 may determine that the host is expected to transmit a particular message by identifying such a message among the messages stored in the database. In particular, the expected behavior/analysis module 350 may compare an incoming request for a network resource associated with the host with the request/response pairs stored in the network traffic library, and may identify one of the stored responses as corresponding to the expected response, based on a similarity of the request paired therewith to the incoming request. Also, the expected behavior/analysis module 350 may identify the incoming request as a request for static information (e.g., a static request), and may determine the expected response based on the data stored in the network traffic library or other pre-existing information that is accessible thereto.

As such, when the host is in the inactive state, the message generation module 360 is configured to generate and transmit a message via the network on behalf of the host based on the expected behavior determined by the expected behavior/analysis module 350. For example, the message generation module 360 may generate and transmit an expected recurring message (such as an availability indicator) on behalf of the host responsive to determination thereof by expected behavior/analysis module 350. Additionally or alternatively, based on the identification of one of the stored responses as corresponding to the expected response by the expected behavior/analysis module 350, the message generation module 360 may generate the expected response and transmit the expected response via the network on behalf of the host. The message generation module 360 may generate the expected response from or by adapting the identified response, for instance, using symmetric field substitution. As such, when the host is in the inactive state, the message generation module 360 is configured to generate and transmit messages on its behalf, providing the appearance that the host is still in the active state, and allowing the host to be maintained in the inactive state for an extended duration.

In addition, based on the current and/or previous network traffic and/or other network conditions (as indicated by the monitoring module 335), the expected behavior/analysis module 350 is configured to determine whether the active state of the host is necessary. For example, the expected behavior/analysis module 350 may identify an incoming request as a request for information not indicated by the monitored network traffic (e.g., a non-static or dynamic request), or may otherwise determine that the expected host behavior is beyond the imitation capabilities of the resource management module 330. As such, the resource management block 330 may signal the host to transition from the inactive state to the active state, for example, via the message generator 360. The resource management block 330 may also relay or forward the received request to the host responsive to signaling the host to switch to the active state, so that the host may respond appropriately.

Although FIG. 3 illustrates example hardware/software architectures that may be used in a device, such as the computing device 200 of FIG. 2, to manage computing resources by monitoring and manipulating availability in accordance with some embodiments described herein, it will be understood that the present invention is not limited to such a configuration but is intended to encompass any configuration capable of carrying out operations described herein. Moreover, the functionality of the computing device 200 of FIG. 2 and the hardware/software architecture of FIG. 3 may be implemented as a single processor system, a multi-processor system, a processing system with one or more cores, a distributed processing system, or even a network of stand-alone computer systems, in accordance with various embodiments.

Figure 4A:
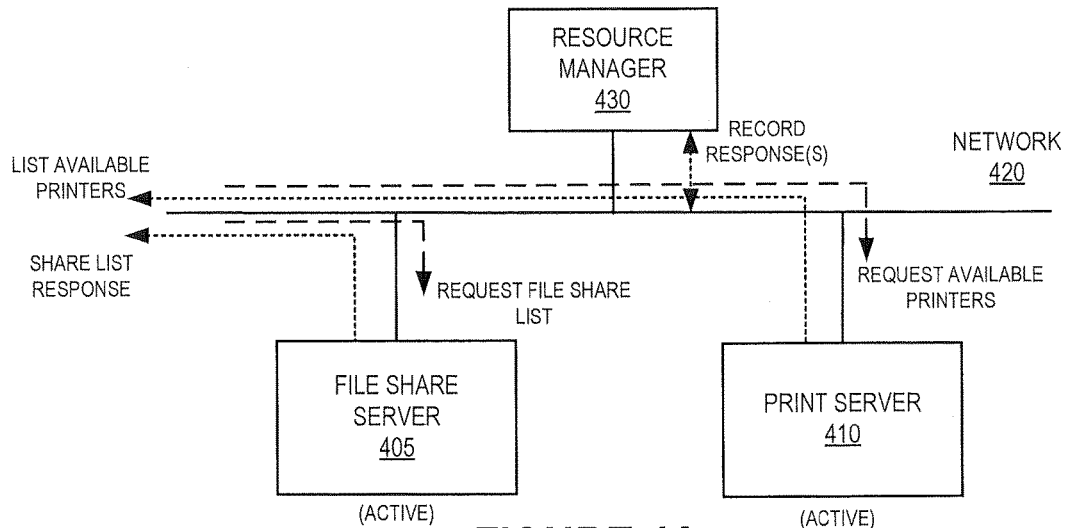
FIGS. 4A-4C are block diagrams illustrating example operations for managing computing resources by monitoring and manipulating availability in accordance with embodiments of the present disclosure.
Figure 4B:
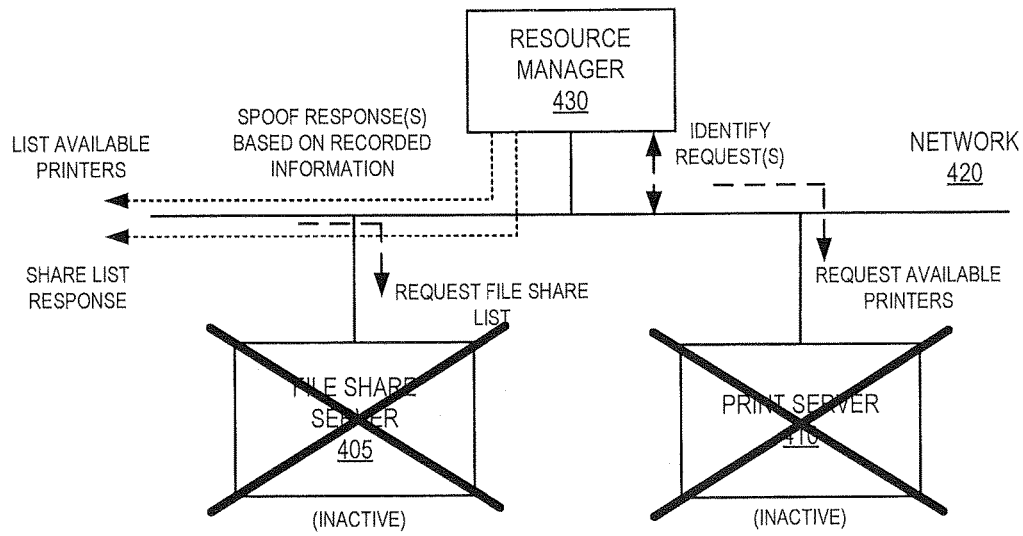
Figure 4C:
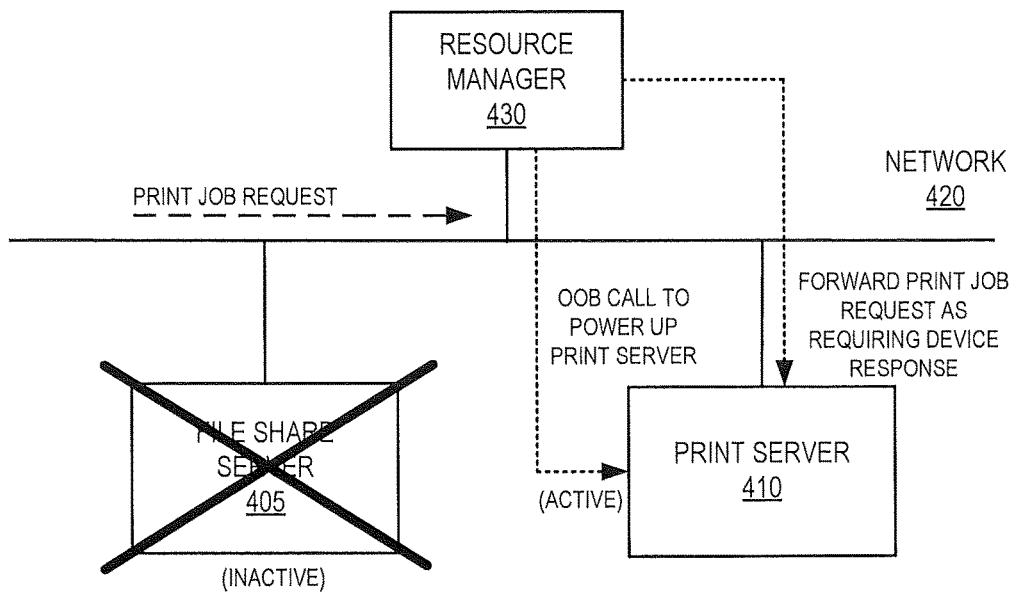

FIGS. 4A-4C illustrate operations for managing computing resources by monitoring and manipulating availability in accordance with some embodiments of the present disclosure. As shown in FIG. 4A, a computing system 400 includes a file share server 405, a print server 410, and a resource manager 430 communicatively coupled via a network 420. In FIG. 4A, the file share server 405 and a print server 410 are in an online or active mode. As such, in response to a request for a file share list, the file share server 405 generates and transmits a list response via the network 420. Likewise, in response to a request for available printers, the printer server 410 generates and transmits a list of available printers via the network 420. The resource manager 430 is configured to monitor traffic on the network 420, including the aforementioned requests and responses, and record these messages in a database, such as the network traffic library 140 of FIG. 1. As such, the resource manager 430 may collect and store historical data indicative of the behavior of the servers/hosts 405, 410, as well as identify and/or enumerate the network resources (as provided by the servers 405, 410) that are available on the network 420.

In FIG. 4B, the resource manager 430 signals the servers 405, 410 to shut down, suspend operations, sleep, or otherwise transition to an inactive state (illustrated by an "X"). The resource manager 430 may signal the servers 405, 410 to enter the inactive state based on a variety of factors or triggers, including but not limited to time-based, date-based, and/or (where multiple servers are present) traffic-based triggers. When the file share server 405 and a print server 410 are inactive, the resource manager 430 is configured to mimic the behavior of the servers 405, 410, based on the requests and responses recorded in FIG. 4A. As such, in response to identifying a request for a file share list on the network 420, the resource manager 430 determines that the requested information can be spoofed, and thus generates and transmits a response to the requesting entity based on the network traffic data previously recorded in FIG. 4A. Similarly, in response to identifying a request for available printers, the resource manager 430 generates and transmits the list of the available printers via the network 420 based on a previously recorded network traffic. The resource manager 430 may thereby determine the expected responses from the file share server 405 and/or the print server 410 and generate the expected responses on their behalf, thereby spoofing or mimicking the behavior of the servers 405 and/or 410. As such, the inactive states of the servers 405 and 410 may be prolonged (thereby saving energy and network resources), while the servers 405 and 410 still appear to be active or otherwise available to the requesting entities.

FIG. 4C illustrates operations of the resource manager 430 in response to a resource request that cannot be spoofed or imitated, such as a dynamic request. In particular, in response to identifying a print request on the network 420, the resource manager 430 determines that the requested information is beyond its capabilities, and that the expected response cannot be mimicked and requires actual interaction with the print server 410. As such, the resource manager 430 stores the print job request and signals the print server 410 to transition to an active state by transmitting an out of band (OOB) call to power up the print server 410. When the print server 410 is active, the resource manager 430 forwards the print job request to the print server 410, and the print server 410 processes the print job request. The resource manager 430 also recognizes that the received print job request does not require interaction with file share server 405, and thus, maintains the file share server 405 in the inactive state. As such, the resource manager 430 is configured to coordinate the availability of the services provided by the servers 405 and/or 410 on-demand.

Computer program code for carrying out the operations discussed above with respect to FIGS. 1-4 may be written in a high-level programming language, such as COBOL, Python, Java, C, and/or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Operations for managing network resources in accordance with some embodiments of the present disclosure will now be described with reference to the flowcharts of FIGS. 5 to 7. The operations described with reference to FIGS. 5 to 7 may be performed by the hardware/software architecture of FIG. 3, the computing device 200 of FIG. 2, the resource manager 130 or 430 of FIGS. 1 and 4, and/or elements thereof.

Figure 5:
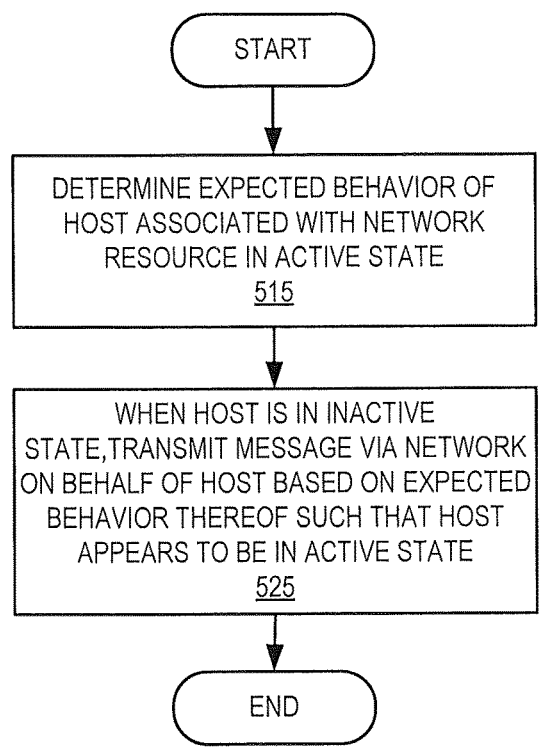
FIGS. 5-7 are flowcharts illustrating methods for managing computing resources by monitoring and manipulating availability in accordance with embodiments of the present disclosure.

Referring now to FIG. 5, operations begin at block 515 where an expected behavior of a host in an active state is determined. The host may manage or otherwise be associated with one or more network resources. For example, the expected behavior of the host may be determined based on messages (including requests and responses) previously communicated with (i.e., to and/or from) the host, which may be stored in a database or library as historical data. As such, when the host is in an inactive state (for example, when the host is shutdown or in "sleep" mode), a message may be transmitted via the network on its behalf based on the expected behavior at block 525. For example, the message may be a recurring message associated with the network resource that is typically transmitted by the host at a predetermined time and/or frequency, or may be a response to a detected request for the network resource. As such, even though the host may be powered-off or otherwise inactive, an appearance of availability of the host may be provided to a requesting device (such as the client 101 of FIG. 1).

Figure 6:
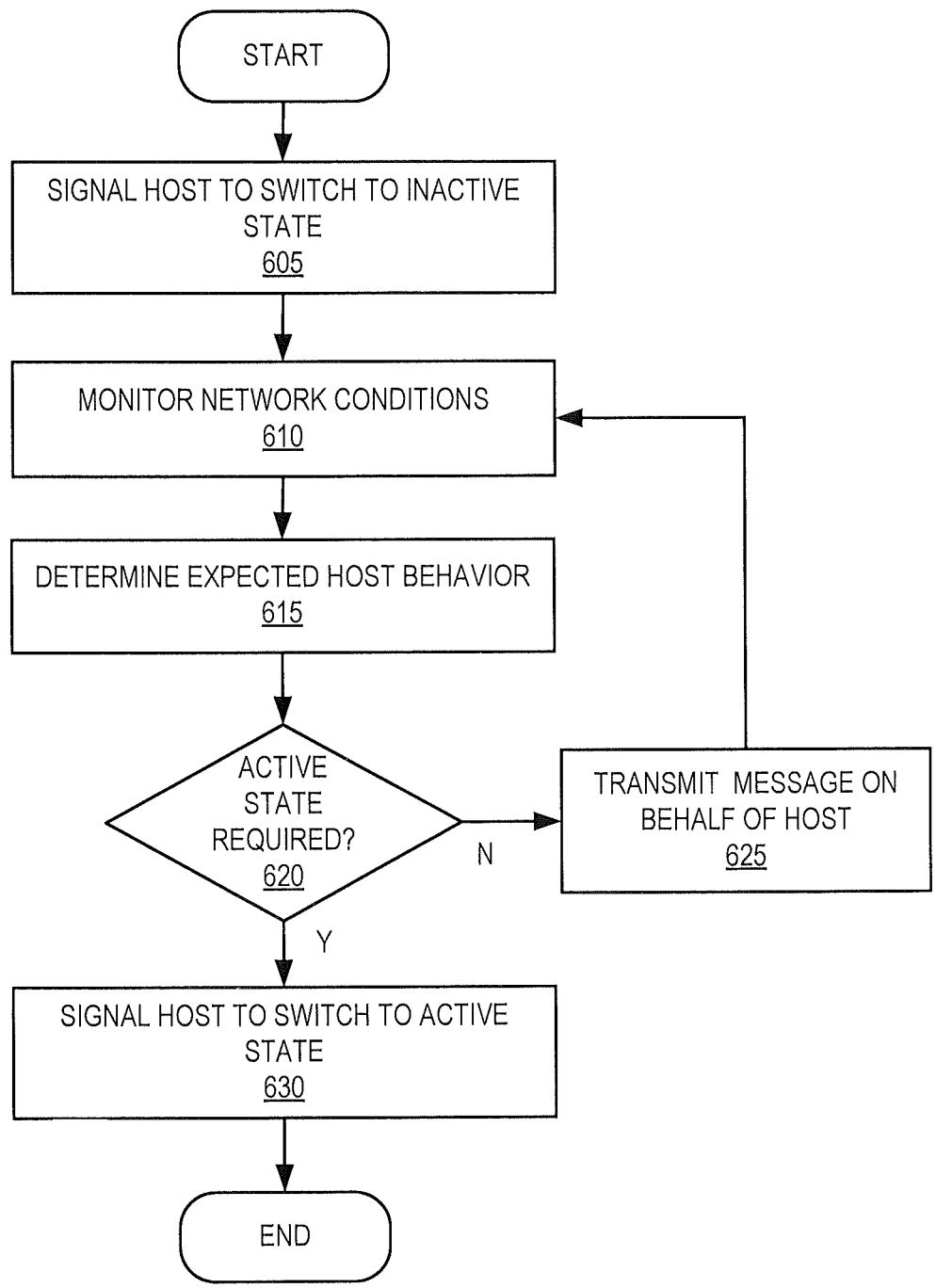

FIG. 6 illustrates operations for managing computing resources by monitoring and manipulating availability in accordance with embodiments of the present disclosure in greater detail. Referring now to FIG. 6, operations began at block 605 where an active host is signaled to switch to an inactive state. For example, the host may be switched to the inactive state based on a threshold, which may be time based, date based, and/or traffic based, or may otherwise be determined based on activity level of the host. In some embodiments, the host may be switched to the inactive states by signaling a hypervisor to suspend a guest operating system (OS), or by signaling the operating system to transition to a suspension or hibernation mode.

While the host is in the inactive state, network conditions are monitored at block 610. For example, the network may be monitored to detect or identify incoming requests for one or more resources managed by the host, and/or to determine other conditions that may require host action. At block 615, an expected behavior of the host is determined based on the network conditions. The expected behavior may be determined based on historical data, such as network traffic previously communicated with the host, which may be monitored and automatically stored in a network traffic library, such as the library 140 of FIG. 1. Additionally or alternatively, a database including information indicative of the expected behavior of the host under a variety of network conditions may be manually created by a programmer or other user.

Still referring to FIG. 6, at block 620, it is determined whether the active state of the host is required. For example, it may be determined that actual host interaction is required based on the expected host behavior in response to an incoming request. In particular, it may be determined that the response to a request for static information does not require host interaction (as the requested information may be included in the stored network traffic library); conversely, it may be determined that the response to a request for dynamic information requires the host to be in the active state (as the requested information may not be indicated by the stored network traffic and/or may otherwise be incapable of being mimicked). If it is determined at block 620 that actual host interaction is required, the host is signaled to switch to the active state at block 630, and the request is relayed to the host so that the host itself may transmit a response.

However, if it is determined at block 620 that actual host interaction is not required, a message is transmitted on behalf of the host at block 625. For example, based on the network conditions, it may be determined that the expected host behavior involves transmission of a recurring message at predetermined times and/or frequencies, and such a message may thereby be generated and transmitted via the network on behalf of the host at block 625. Additionally or alternatively, it may be determined that a response to an incoming request may be generated by referencing a similar previously stored request and its associated response stored in the network traffic library, and such a response may be generated and transmitted on behalf of the host at block 625 in response to the request. As such, the active behavior of the host may be mimicked while maintaining the host in the inactive state, thereby providing an appearance availability to a requesting entity while increasing the duration of inactivity of the host, saving both money and resources.

Figure 7:
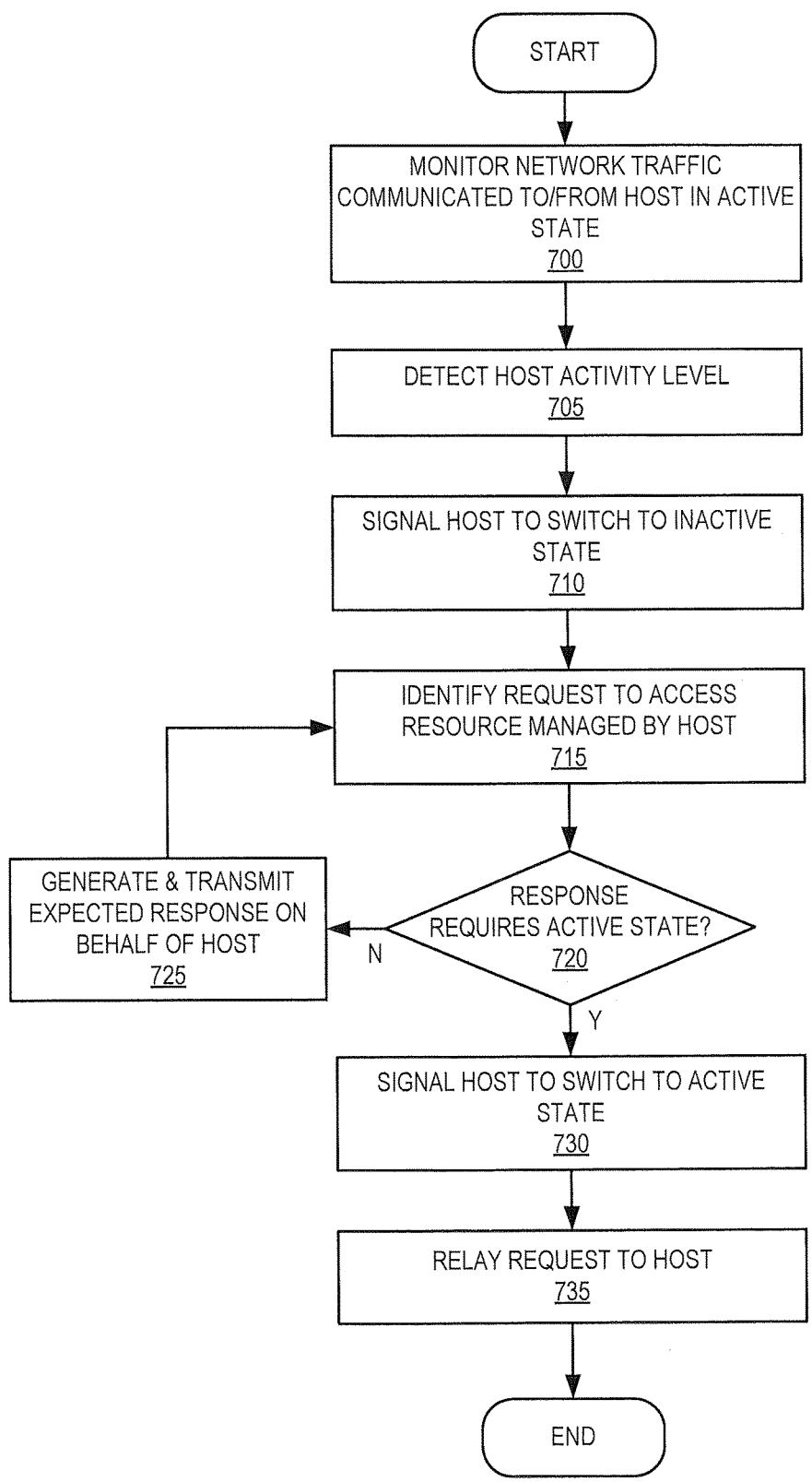

FIG. 7 further illustrates operations for managing computing resources by monitoring and manipulating availability in accordance with embodiments of the present disclosure. Referring now to FIG. 7, operations begin at block 700, where the network is monitored (or "snooped" in a promiscuous mode) for traffic communicated to and/or from an active host. Network resource(s) managed by the host may be identified and/or enumerated responsive to the monitoring. For example, it may be determined that one of the hosts being managed has a shared printer, and that this fact is 'announced' at regular periods by the host OS. As another example, it may be determined that a regular ICMP (ping)

packet or ARP packet is transmitted on a recurring basis to indicate the availability of a host.

At block 705, the activity level of the host is detected. In some embodiments, a threshold (for example, based on time, date, and/or network traffic) may be used to detect the host activity level. When it is determined that a particular host is not in use, the host is signaled to transition to a low/no power state (or other inactive state) at block 710. For example, the host may be transitioned to the inactive state by signaling its hypervisor to suspend the guest OS, or by signaling the OS to suspend and/or hibernate.

While the host is in the inactive state, the behavior of the host may be imitated or mimicked so as to provide an appearance of host availability. For example, recurring messages that are typically transmitted by the host may be repeatedly and/or periodically be broadcast on behalf of the host while the host is inactive. In a particular example, while the host is in the inactive state, a request to access a resource managed by the host is identified at block 715, and it is determined at block 720 whether a response to the request requires the host to be in the active state. For instance, as noted above, responses to requests for dynamic information may require actual host interaction, while responses to requests for static information may not (as such information may be available from and/or indicated by a database, such as the network traffic library described herein). If it is determined at block 720 that the active state of the host is not required, a response is generated and transmitted on behalf of the host at block 725. For example, in the case of an ICMP request, the appropriate ICMP response may be generated and transmitted, such that the host appears to be up and available on the network.

On the other hand, if a request is identified at block 715 and it is determined at block 720 that a response requires actual server interaction (for example, a request for print job), the host is signaled to resume/wakeup or otherwise transition to the active state at block 730. When the host wakes or is otherwise active, a copy of the request identified at block 715 is relayed to the host at block 735. The host may thereby respond appropriately. Accordingly, embodiments of the present disclosure allow for automatic management of host shutdown and start up, while retaining the appearance of availability.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of managing a computing network, the method comprising:

monitoring, for a host configured to be switched between active and inactive states, network traffic communicated with the host in the active state, wherein the monitoring comprises operations performed by a processor remote from the host;

identifying network resources managed by the host that are available on the computing network based on the monitoring network traffic communicated with the host in the active state, wherein the identifying comprises operations performed by the processor remote from the host;

creating a database including request and response pairs based on monitoring the network traffic communicated with the host in the active state, wherein the requests are received by the host during the active state and the responses are transmitted from the host during the active state, wherein the request and response pairs are stored in the database responsive to monitoring the network traffic communicated with the host;

after monitoring network traffic communicated with the host in the active state and after identifying the network resources managed by the host that are available, signaling the host over the computing network to switch from the active state to the inactive state based on an activity level thereof relative to a threshold, responsive to the monitoring, wherein the signaling comprises operations performed by the processor remote from the host;

after signaling the host to switch to the inactive state, determining an expected behavior of the host based on the network traffic communicated with the host in the active state as monitored before signaling to switch to the inactive state, based on the network resources that are available as identified before signaling to switch to the inactive state, and based on current network conditions indicated by the monitoring after signaling to switch to the inactive state wherein the determining the expected behavior comprises identifying a response among the responses stored in the database, wherein the determining comprises operations performed by the processor remote from the host;

generating a message by adapting the response identified from the database using symmetric field substitution based on the expected behavior of the host, wherein the symmetric field substitution is based on the network traffic communicated with the host in the active state, and is further based on the current network conditions with the host in the inactive state, wherein the generating comprises operations performed by the processor remote from the host; and transmitting, when the host is in the inactive state, the message via the computing network on behalf of the host based on the expected behavior of the host under the current network conditions and the network resources that are available such that an available one of the network resources managed by the host appears to be in the active state, wherein the transmitting comprises operations performed by the processor remote from the host.

2. The method of claim 1, further comprising:
when the host is in the inactive state, identifying a request for the network resource managed by the host,
wherein generating the message comprises generating an expected response to the request based on the network traffic communicated with the client in the active state before signaling to switch to the inactive state, and wherein transmitting the message comprises transmitting the expected response via the network responsive to the request.

3. The method of claim 2, wherein the identifying comprises identifying the request as a request for static information that is indicated by the network traffic communicated with the host in the active state before signaling to switch to the inactive state.

4. The method of claim 1, further comprising:
when the host is in the inactive state, identifying a request for the network resource as requiring the host to be in the active state after transmitting the message, wherein the identifying comprises operations performed by the processor remote from the host; and
signaling the host to switch from the inactive state to the active state responsive to the identifying, wherein the signaling to switch to the active state comprises operations performed by the processor remote from the host.

5. The method of claim 4, wherein the identifying comprises identifying the request as a request for dynamic information, and further comprising:
relaying the request for the dynamic information through the computing network to the host responsive to signaling the host to switch to the active state, wherein the relaying comprises operations performed by the processor remote from the host.

6. A computer system for managing a computing network, comprising:
a processor; and
a memory coupled to the processor, the memory comprising computer readable program code embodied therein that, when executed by the processor, causes the processor to perform operations comprising:
monitor, for a host configured to be switched between active and inactive states, network traffic communicated with the host in the active state, wherein the processor is remote from the host;
identify network resources managed by the host that are available on the computing network based on monitoring the network traffic communicated with the host in the active state;

create a database including request and response pairs based on monitoring the network traffic communicated with the host in the active state, wherein the requests are received by the host during the active state and the responses are transmitted from the host during the active state, wherein the request and response pairs are stored in the database responsive to monitoring the network traffic communicated with the host;

after monitoring network traffic communicated with the host in the active state and after identifying the network resources managed by the host that are available, signal the host over the computing network to switch from the active state to the inactive state based on an activity level thereof relative to a threshold, responsive to the monitoring;

after signaling the host to switch to the inactive state, determine an expected behavior of the host based on the network traffic communicated with the host in the active state as monitored before signaling to switch to the inactive state, based on the network resources that are available as identified before signaling to switch to the inactive state, and based on current network conditions indicated by the monitoring after signaling to switch to the inactive state, wherein the determining the expected behavior comprises identifying a response among the responses stored in the database;

generate a message by adapting the response identified from the database using symmetric field substitution based on the expected behavior of the host, wherein the symmetric field substitution is based on the network traffic communicated with the host in the active state, and is further based on the current network conditions with the host in the inactive state, wherein the generating comprises operations performed by the processor remote from the host; and transmit, when the host is in the inactive state, the message via the computing network on behalf of the host based on the expected behavior of the host under the current network conditions and the network resources that are available such that an available one of the network resources managed by the host appears to be in the active state.

7. The computer system of claim 6, wherein, when executed by the processor, the computer readable program code further causes the processor to:
when the host is in the inactive state, identify a request for the network resource managed by the host;
generate an expected response to the request based on the network traffic communicated therewith; and
transmit the message comprising the expected response via the network responsive to the request.

8. The computer system of claim 7, wherein, when executed by the processor to identify the request, the computer readable program code further causes the processor to:
identify the request as a request for static information indicated by the network traffic communicated with the host.

9. The computer system of claim 6, wherein, when executed by the processor, the computer readable program code further causes the processor to:
when the host is in the inactive state, identify a request for the network resource as requiring the host to be in the active state; and
transmit a signal to the host to switch from the inactive state to the active state responsive to identification of the request, wherein transmitting the signaling to switch to the active state comprises operations performed by the processor remote from the host.

10. The computer system of claim 9, wherein, when executed by the processor to identify the request, the computer readable program code further causes the processor to:
identify the request as a request for dynamic information; and
relay the request for the dynamic information through the computing network to the host responsive transmission of the signal to the host to switch to the active state, wherein relaying comprises operations performed by the processor remote from the host.

11. A computer program product for managing a computing network, comprising:
a non-transitory computer readable storage medium having computer readable program code embodied in the medium, the computer readable program code comprising:
computer readable program code to monitor, for a host configured to be switched between active and inactive states, network traffic communicated with the host in the active state, wherein monitoring comprises monitoring at a processor remote from the host;
computer readable program code to identify network resources managed by the host that are available on the computing network based on monitoring the network traffic communicated with the host in the active state, wherein identifying comprises identifying at the processor remote from the host;
computer readable program code to create a database including request and response pairs based on monitoring the network traffic communicated with the host in the active state, wherein the requests are received by the host during the active state and the responses are transmitted from the host during the active state, wherein the request and response pairs are stored in the database responsive to monitoring the network traffic communicated with the host;
computer readable program code to signal the host over the computing network to switch from the active state to the inactive state based on an activity level thereof relative to a threshold, responsive to the monitoring, after monitoring network traffic communicated with the host in the active state and after identifying the network resources managed by the host that are available, wherein signaling comprises signaling from the processor remote from the host;
computer readable program code to determine an expected behavior of the host after signaling to switch to the inactive state based on the network traffic communicated with the host in the active state as monitored before signaling to switch to the inactive state, based on the network resources that are available as identified before signaling to switch to the inactive state, and based on current network conditions indicated by the monitoring after signaling to switch to the inactive state, wherein determining the expected behavior comprises identifying a response among the responses stored in the database, wherein determining comprises determining at the processor remote from the host;
computer readable program code to generate a message by adapting the response identified from the database using symmetric field substitution based on the expected behavior of the host, wherein the symmetric field substitution is based on the network traffic communicated with the host in the active state, and is further based on the current network conditions with the host in the inactive state, wherein the generating comprises operations performed by the processor remote from the host; and
computer readable program code to transmit, when the host is in the inactive state, the message via the computing network on behalf of the host based on the expected behavior of the host under the current network conditions and the network resources that are available such that an available one of the network resources managed by the host appears to be in the active state, wherein transmitting comprises transmitting from the processor remote from the host.

12. The method of claim 1, wherein the computing network comprises a publically accessible global network, wherein monitoring comprises monitoring network traffic communicated with the host in the active state using a network sniffer tool over the publically accessible global network, wherein identifying comprises identifying based on the monitoring using the sniffer tool over the publically accessible global network, wherein signaling comprises signaling the host over the publically accessible global network, and wherein transmitting comprises transmitting the message via the publically accessible global network on behalf of the host.

13. The computer system of claim 6, wherein the computing network comprises a publically accessible global network, wherein monitoring comprises monitoring network traffic communicated with the host in the active state using a network sniffer tool over the publically accessible global network, wherein identifying comprises identifying based on the monitoring using the sniffer tool over the publically accessible global network, wherein signaling comprises signaling the host over the publically accessible global network, and wherein transmitting comprises transmitting the message via the publically accessible global network on behalf of the host.

14. The method of claim 1, further comprising:
when the host is in the inactive state, identifying a request for the network resource as a dynamic request requiring the host to be in the active state;
signaling the host to switch from the inactive state to the active state responsive to the identifying; and
relaying the dynamic request to the host responsive to signaling the host to switch to the active state.

15. The method of claim 1 wherein identifying the response comprises identifying the response among the responses stored in the database responsive to an incoming request.

16. The method of claim 6 wherein identifying the response comprises identifying the response among the responses stored in the database responsive to an incoming request.

17. The method of claim 11 wherein identifying the response comprises identifying the response among the responses stored in the database responsive to an incoming request.

* * * * *